May 22, 1956 R. M. KRUEGER Re. 24,154

HIGH-FREQUENCY TRANSMISSION CABLE

Original Filed Sept. 18, 1948

INVENTOR.
Ringland M. Krueger
BY Ooms, McDougall, Williams & Hersh
Attorneys

United States Patent Office

Re. 24,154
Reissued May 22, 1956

24,154

HIGH-FREQUENCY TRANSMISSION CABLE

Ringland M. Krueger, Chicago, Ill., assignor to American Phenolic Corporation, Chicago, Ill., a corporation of Illinois Original No. 2,543,696, dated February 27, 1951, Serial No. 49,927, September 18, 1948. Application for reissue April 19, 1955, Serial No. 502,538

Matter enclosed in heavy brackets [ ] appears in the original patent but forms no part of this reissue specification; matter printed in italics indicates the additions made by reissue.

2 Claims. (Cl. 174—113)

This invention relates to improvements in multiple-lead transmission cables and refers particularly to a cable of this class wherein the field between the leads is largely air, the cable being so constructed that moisture, water, ice or other substances detrimental to the efficiency of the cable as a transmission agency can never lodge between the leads constituting the cable.

Multiple-lead cables for transmission purposes have heretofore been proposed, but substantially all have been characterized by having the leads separated by an excessive amount of solid dielectric material and the forms of said cables have frequently been such that when exposed to weather conditions moisture, water, ice, snow or other "high loss" materials could lodge on the surface of the dielectric material separating the leads and within the electric field. In view of the fact that the field between such leads is most intense directly between the leads or conductors, the interpositioning in the field of the conductors of such "high loss" material or materials not approaching the dielectric characteristics of air results in low transmission efficiency.

As a feature of the present invention, the leads or conductors of the cable are embedded in diametrically opposite walls of a tube of dielectric material. The dielectric material employed is sufficiently stiff to prevent collapsing of the tube in normal use and is preferably a material which is weather-resistant and has per se good dielectric properties. By virtue of the position of the conductors in the tube walls, they will always be spaced a relatively constant distance from each other and the space between them is largely constituted of air being included between and shielded by the curved tube walls which are bisected by a plane disposed at right-angles to the plane of the conductor centerlines.

It can readily be seen that materials which may precipitate or lodge on the walls of the tube will, by virtue of the tube walls, never be interpositioned between the conductors. Hence, the advantages of a substantially constant air dielectric always obtain.

Other features and advantages of the invention will be apparent from the accompanying drawing and following detailed description.

Figure 1:
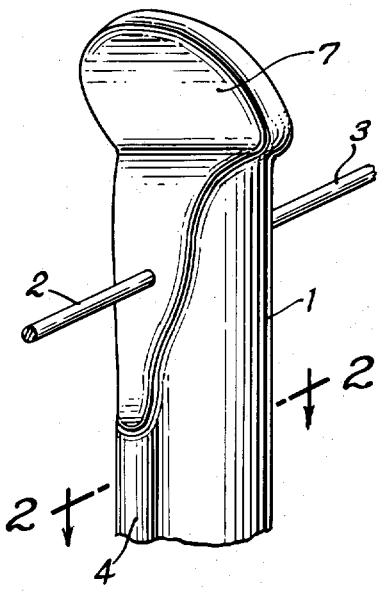
Fig. 1 is a detailed perspective view of the sealed end of my twin lead cable.
Figure 3:
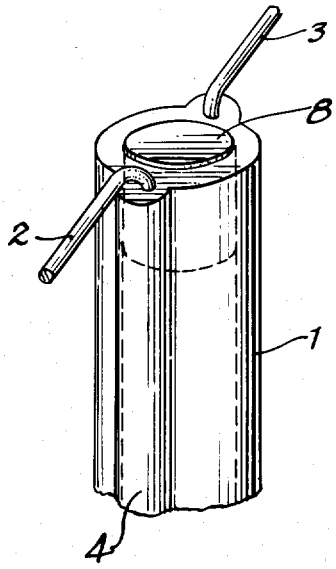
Fig. 3 is a detailed perspective view of the cable end showing another form of sealing the exposed end of the cable.
Figure 2:
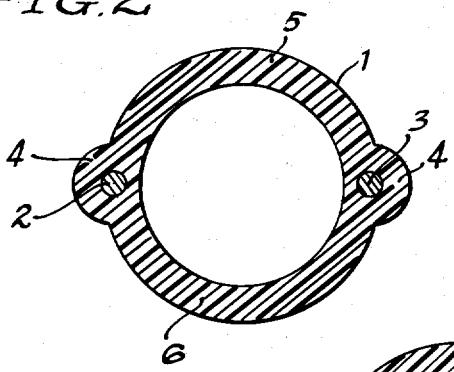
Fig. 2 is a sectional view taken on line 2—2 of Fig. 1.

Referring particularly to the drawing, 1 indicates a multiple-lead cable of the twin-lead type, the cable being generally of tubular construction. Leads or conductors 2 and 3 are embedded in diametrically opposite portions of the tube wall, said leads being coextensive with the length of the tube and being carried, by virtue of their position in the tube wall, in fixed parallel relationship to each other.

In order to embed the conductors 2 and 3 of predetermined diameter, beads 4 may be formed on the outer surface of the tube 1 which traverse the length of the conductors. In this manner, conductors of predetermined maximum diameter may be properly embedded in a tube whose wall thickness is a predetermined minimum. Additionally the beads 4 assist in stiffening the tube and preventing undue distortion thereof in use.

The tube 1 is formed of a dielectric material of such a nature, and the wall thickness may be such, that the cable can be bent or slightly twisted without collapsing or being unduly distorted. That is, in normal reasonable usage of the cable the distance between the leads 2 and 3 will be maintained substantially constant thereby preserving its characteristic impedance constant throughout its length. As a preferred material for the tube walls, I employ a polyethylene resin. However, other dielectric materials such as natural or synthetic rubber or other resinous material such as, polytetrafluoroethylene, commercially known as "Teflon," a polymer of trifluorochloroethylene commercially known as "Kel-F," or the like, may be employed so long as in use the tube constructed therefrom will not readily collapse.

It is well known that in the transmission of high frequency electric currents the electric field directly between the conductors is strongest and depending upon the dielectric material in said field greater or lesser "dielectric losses" will occur. It is also known that air is an excellent dielectric. In the present invention, it can be readily seen that the major portion of the field between the opposite leads comprises air. Moreover, by virtue of arcuate portions 5 and 6 of the tube, that is, those portions bisected by a plane at right-angles to the plane including the centerlines of the conductors 2 and 3, any foreign particles such as moisture, water, snow, ice, atmospheric dirt or the like which may deposit upon the outer walls of the tube will be prevented from assuming a position between the conductors.

At points of connection where the conductors are withdrawn from their embedded position within the walls of the tube 1, the walls of the tube, especially at the exposed end of the cable, are preferably sealed. The sealing of the tube may be accomplished by heating the dielectric material comprising the tube until it is in a substantially plastic state at which time the end of the tube may be pinched together as at 7 in Fig. 1. This operation may be conveniently performed by merely squeezing the heated end of the tube between the jaws of the usual pliers thereby causing the tube walls to be welded together to form the seal 7.

Alternatively, a cylindrical plug 8 may be inserted in the open end of the tube 1, said plug preferably comprising a material similar to that constituting the tube. The plug may be adhesively sealed to the interior of the tube or may be heat sealed thereto. If the tube 1 is constructed of polyethylene resin, plugs 8 may be formed from polyethylene rods which are readily available commercially.

Although the end of the cable exposed to weather conditions is preferably sealed, as hereinbefore described, the inner end of the cable is preferably left open so as to prevent condensation forming within the cable.

Figure 4:
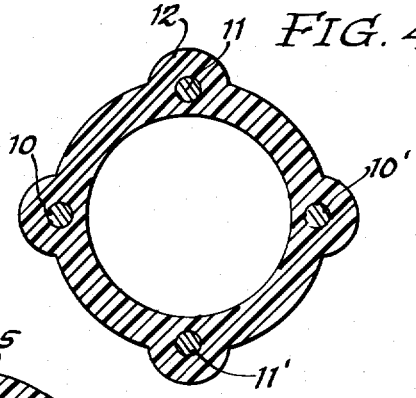
Fig. 4 is a transverse sectional view of a modification of my invention illustrating a quadruple-lead cable.

Referring particularly to Fig. 4, a slight modification of my invention is shown wherein a tube 9 constructed of a material similar to the tube 1 has embedded in its wall four conductors 10—10' and 11—11', the conductors being spaced 90° from each other. In view of the fact that the electrical field between each pair of conductors is greatest in the zone directly between the opposite conductors, and that by virtue of the cylindrical formation of the cable 2, this zone is maintained free of "high loss" materials, the cable comprising the multiple leads 10—10' and 11—11' will have a high transmission efficiency. In this form of cable, beads 12 are provided upon the exterior walls of the tube 9, said beads being linearly coextensive with the conductors 10—10' and 11—11'.

Of course, it is to be understood, that any number of conductors may be employed as desired, all of said conductors occupying positions in the wall of the tube.

Figure 5:
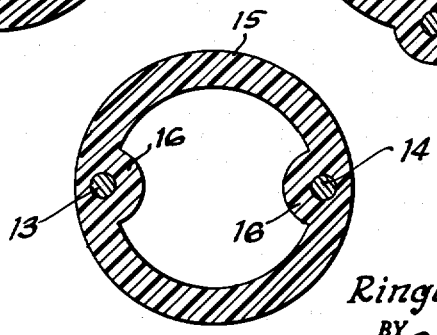
Fig. 5 is a transverse sectional view of another modification of my invention illustrating the formation of beads upon an interior surface of the dielectric tube.

Referring particularly to Fig. 5, another form of my invention is illustrated wherein twin leads 13 and 14 are embedded in the wall of a tube 15. The tube 15 is similar to the tube constituting the cable 1 except that beads 16 instead of being formed upon the exterior surface of the tube, are formed upon the interior surface of the tube. Those advantages which have hereinbefore been pointed out with respect to the cable 1 are also inherent in the cable comprising the tube 15 and conductors 13 and 14.

Other obvious modifications of the present invention will suggest themselves to those skilled in the art and, hence, I do not wish to be limited except as necessitated by the prior art.

I claim as my invention:

[1. A cable for the transmission of relatively high frequency electric currents which comprises an elongated hollow tube constructed of a dielectric material, the walls of the tube being relatively thin compared to the tube diameter, and a plurality of electric conductors embedded in opposite walls of the tube, said conductors being substantially coextensive with the length of said tube.]

[2. A cable for the transmission of relatively high frequency electric currents which comprises an elongated hollow tube of substantially circular cross section having walls relatively thin compared to the inner diameter of the tube, said tube walls consisting of a di-electric material having characteristics of relatively high resistance to distortion, and a plurality of electric conductors embedded in opposite walls of the tube and being separated by an air path substantially equal in length to the inner diameter of the tube, said conductors being substantially coextensive and parallel to the axis of said tube throughout its entire length.]

[3. A cable for the transmission of relatively high frequency electric currents which comprises an elongated hollow cylindrical tube constructed of a di-electric material, a plurality of electric conductors embedded in opposite walls of the tube and coextensive with the length of said tube, the air path between opposite conductors being relatively great in length compared to the wall thickness of the tube, and a bead of di-electric material carried by the wall of said tube adjacent that portion of the tube carrying each conductor, said beads and conductors being substantially parallel to the longitudinal axis of the tube throughout the entire length of the tube.]

[4. A cable for the transmission of relatively high frequency electric currents which comprises an elongated hollow tube having walls relatively thin compared to the diameter of the tube, said walls being of a dielectric material and a pair of electric conductors embedded in opposite walls of the tube, said conductors being substantially coextensive with the length of said tube.]

[5. A cable for the transmission of relatively high frequency electric currents which comprises an elongated hollow tube constructed of polyethylene resin, and a pair of electric conductors embedded in diametrically opposite walls of the tube and substantially coextensive with the length of said tube, the length of the air path between said conductors being relatively great compared to the wall thickness of that portion of the tube walls in which the conductors are embedded.]

[6. A cable for the transmission of relatively high frequency electric currents which comprises an elongated hollow tube of substantially circular cross-section, the walls of said tube being constructed of a dielectric material and being relatively thin compared to the diameter of the tube, a plurality of electric conductors embedded in opposite walls of the tube and coextensive with the length of said tube, and a bead of dielectric material carried on the outer surface of the wall of said tube adjacent that portion of the tube carrying each conductor, and in which said conductor is embedded.]

[7. A cable for the transmission of relatively high frequency electric currents which comprises an elongated hollow tube of substantially circular cross-section, the walls of said tube being constructed of a dielectric material and being relatively thin compared to the inner diameter of the tube, a plurality of electric conductors embedded in opposite walls of the tube and coextensive with said tube, and a bead of dielectric material carried on the inner surface of the wall of said tube adjacent that portion of the tube carrying each conductor.]

[8. A cable for the transmission of relatively high frequency electric currents which comprises an elongated tube constructed of a dielectric material, a pair of electric conductors embedded in opposite walls of the tube and coextensive with the length of said tube, and a bead of dielectric material carried on the outer surface of the wall of said tube adjacent that portion of the tube carrying each conductor.]

[9. A cable for the transmission of relatively high frequency electric currents which comprises an elongated tube constructed of a dielectric material, a pair of electric conductors embedded in opposite walls of the tube and coextensive with said tube, and a bead of dielectric material carried on the inner surface of the wall of said tube adjacent that portion of the tube carrying each conductor.]

[10. A cable for the transmission of relatively high frequency electric currents wherein connections are made thereto at opposite ends, one end being connected in the exterior atmosphere and the other end being connected in the interior atmosphere of a building, which comprises an elongated hollow tube of substantially circular cross-section, the walls of said tube being relatively thin compared to the tube diameter, and a plurality of electric conductors embedded in opposite walls of the tube, said conductors being substantially coextensive with the length of said tube, said tube being sealed adjacent its exterior connection and being open adjacent its interior connection.]

[11. A cable for the transmission of relatively high frequency electric currents wherein connections are made thereto at opposite ends, one end being connected in the exterior atmosphere and the other end being connected in the interior atmosphere of a building, which comprises an elongated hollow tube of substantially circular cross-section, the walls of said tube being relatively thin compared to the tube diameter, and a plurality of electric conductors embedded in opposite walls of the tube, the air path between said conductors being relatively great compared to the thickness of those portions of the tube wall in which the conductors are embedded, said conductors being substantially coextensive with the length of said tube, said tube being sealed adjacent its exterior connection and being open adjacent its interior connection.]

*12. An electric transmission cable adapted to be used in applications where it is exposed to weathering at at least one end portion thereof, comprising a thin-walled seamless integral single-layer air-filled tube of flexible thermoplastic dielectric material having a pair of flexible electric conductors embedded in opposite walls thereof and extending therein parallel to the axis of said tube, the outer walls of said tube between said conductors being of convex contour, the interior of said tube being substantially free from foreign matter throughout its*

*length, the ends of said conductors at the said exposed end portion of said tube being pulled outwardly away from said tube without disturbing the integrity of the inner tube wall, and the walls of said tube at said exposed end portion being merged together into an integral plastic mass to form an air-tight end seal for said tube.*

*13. An electric transmission cable adapted to be used in applications where it is exposed to weathering at at least one end portion thereof, comprising a thin-walled single-layer air-filled integral tube of flexible thermoplastic dielectric material having a pair of flexible electric conductors embedded in opposite walls thereof and extending therein parallel to the axis of said tube, the outer walls of said tube between said conductors being of convex contour and the interior of said tube being substantially free from foreign matter throughout its*

*length, the walls of said tube at said exposed end portion being merged together into an integral plastic mass forming an air-tight end seal for said tube.*

References Cited in the file of this patent or the original patent

UNITED STATES PATENTS

| | | |
|---|---|---|
| 466,250 | Marsh | Dec. 29, 1891 |
| 469,248 | Holman | Feb. 23, 1892 |
| 597,790 | Smith et al. | Jan. 25, 1898 |
| 1,305,247 | Beaver et al. | June 3, 1919 |
| 1,996,186 | Affel | Apr. 2, 1935 |
| 2,379,318 | Safford | June 26, 1945 |

FOREIGN PATENTS

| | | |
|---|---|---|
| 8,573 | Great Britain | Apr. 30, 1895 |